March 21, 1961 — A. M. MOEN — 2,975,806
BODY FORMING VALVE CHAMBER AND STEM MOUNTING
Filed Oct. 1, 1956 — 2 Sheets-Sheet 1
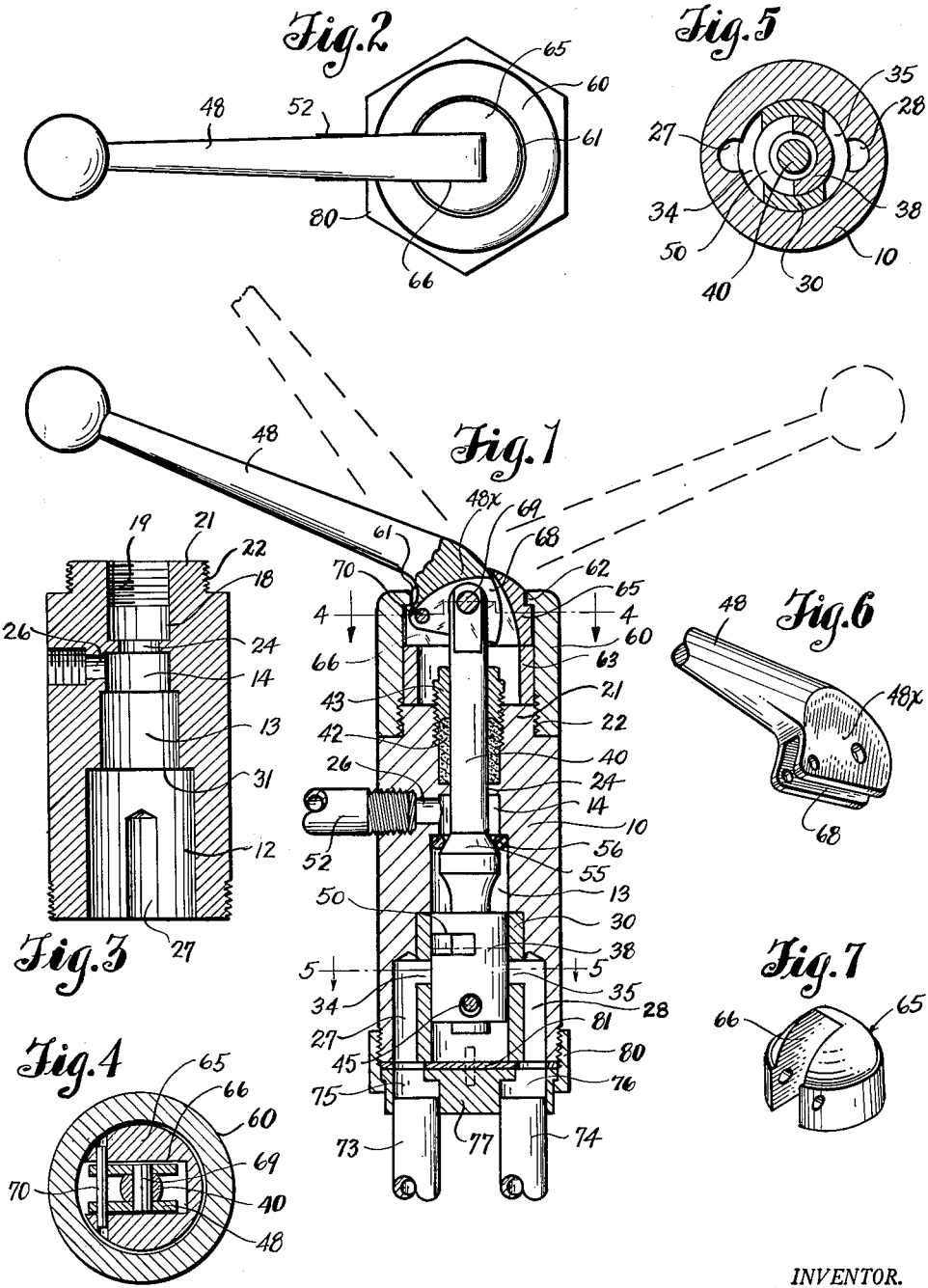
INVENTOR.
ALFRED M. MOEN
BY Robinson & Berry
ATTORNEYS March 21, 1961  A. M. MOEN  2,975,806
BODY FORMING VALVE CHAMBER AND STEM MOUNTING
Filed Oct. 1, 1956  2 Sheets-Sheet 2

INVENTOR.
ALFRED M. MOEN
BY
Robinson & Berry
ATTORNEYS

United States Patent Office 2,975,806
Patented Mar. 21, 1961

2,975,806

BODY FORMING VALVE CHAMBER AND STEM MOUNTING

Alfred M. Moen, 377 Woodland Ave., Elyria, Ohio

Filed Oct. 1, 1956, Ser. No. 613,031

4 Claims. (Cl. 137—625.17)

This invention relates to faucets and it has reference more particularly to hot and cold water mixing faucets wherein a single valve and a single handle is employed for controlling both the flow and water mixture; the present invention being an improvement in faucets of the character of that shown in my U.S. Patent No. 2,609,206, issued on September 2, 1952.

It is the principal object of the present invention to provide a simplified faucet construction and to lessen the cost of manufacture without necessitating any change in mode of operation or any lessening of efficiency.

It is also an object of the present invention to provide a simplified and improved means for effecting a more practical, and less expensive mounting for the valve controlling handle and to provide also a more effective operating connection between handle and valve stem.

It is also an object of the present invention to provide a novel method and means for connecting the hot and cold water supply lines to the faucet body.

Yet another object resides in the provision of means for effecting a pressure balanced stem.

Further objects of the invention reside in the details of construction and combination of parts and in their mode of operation, as will hereinafter be fully described.

In accomplishing these and other objects of the invention, I have provided the improved details of construction, the preferred forms of which are illustrated in the accompanying drawings, wherein:

Fig. 1 is a sectional view of a faucet embodying the novel improvements of the present therein; the view being taken on the axial line of the faucet body.

Fig. 2 is an upper end view of the faucet as shown in Fig. 1.

Fig. 3 is a longitudinal section taken on the axial line of the faucet body member.

Fig. 4 is a horizontal section taken on line 4—4 in Fig. 2 showing the handle mounting and the operating connection between handle and valve stem.

Fig. 5 is a horizontal section taken on line 5—5 in Fig. 1.

Fig. 6 is a perspective view of the inner or mounting end portion of the valve adjusting handle.

Fig. 7 is a perspective view of the handle mounting bearing.

Figure 8:
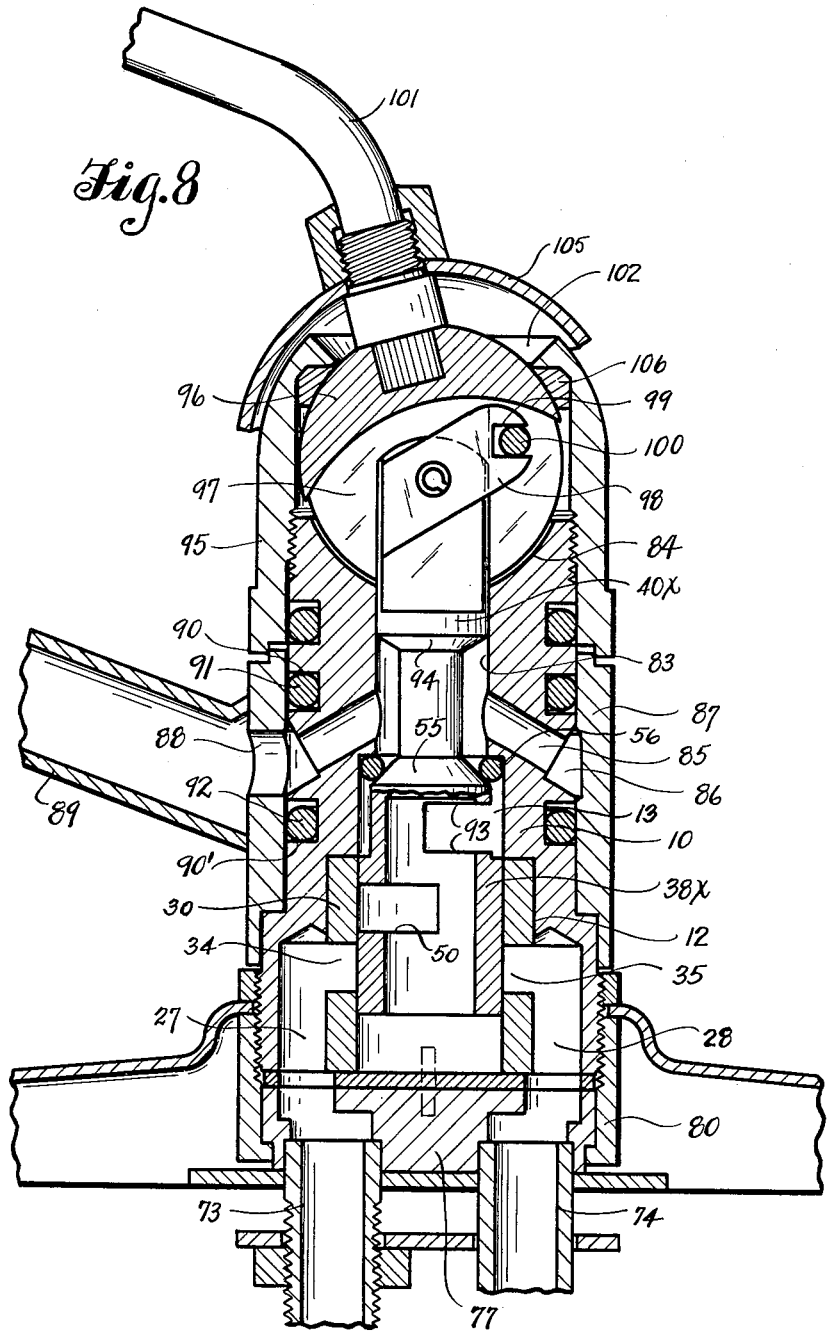
Fig. 8 is an axial section of a faucet of an alternative form of construction, having a pressure balanced valve and stem.

In the past, it has been a practise in the making of faucets of those particular types exemplified by my prior patent above mentioned, to provide a housing, formed with a valve chamber having hot and cold water inlets and outlets, into which housing a plug was threaded and in which plug a stem, for control and adjustment of the valve, was mounted. Also, in most instances it has been a practise to apply a sleeve about the plug for mounting a spout for the discharge of water from the faucet under control of the valve.

The combination of parts as previously employed, and the extensive machining therein necessary to make the parts function properly and in the intended manner was not only expensive, but also added to the already intricate problems of assembly.

The present invention provides a construction in which that part previously referred to as the plug, has been eliminated, and a single unitary and relatively inexpensive member serves both as the valve housing and as the plug previously employed.

Referring now more in detail to the drawings, and more particularly to Fig. 1: 10 designates the main body member of the faucet. This piece comprises a short length of metal, preferably of cylindrical form. It is best shown in Fig. 3 that this piece is formed with an axial bore leading upwardly thereinto from its lower end; the bore being of three stepped or reduced diameters, thus to provide a cylindrical lower end chamber 12, a shorter intermediate or mixing chamber 13, and a still shorter outlet chamber 14. Likewise, leading downwardly into the upper end portion of the body 10, coaxial thereof is a bore that forms a cylindrical packing chamber 18. This is threaded along its upper end portion, as at 19, to receive a packing retaining nut as presently explained. The upper end portion of the body 10 is of reduced diameter, thus providing a short neck portion 21 that is exteriorly threaded as at 22. In coaxial alignment with the upper and lower end bores of the body 10 is a bore 24 that connects the upper end of chamber 14 with the lower end of chamber 18 for the passage of the valve controlling stem, as will presently be explained.

It is further shown in Figs. 1 and 2, that an outlet port 26 leads radially outward from the chamber 14, and that inlet passages 27 and 28 are bored upwardly into the body from its lower end, at diametrically opposite sides of the chamber 12. These passages or bores overlap the chamber bore, as noted in Fig. 5, and extend to above the level of its medial point.

Pressed into the chamber 12 is a cylindrical sleeve 30 of a hardened metal. This sleeve is tightly abutted at its upper end against the annular shoulder 31 at the junction of chambers 12 and 13, and terminates at its lower end flush with the lower end surface of the body 10. The inside diameter of the sleeve 30 is exactly equal to that of the chamber 13. This sleeve 30 is formed at diametrically opposite sides with transverse slots 34—35 that open through its walls to the inside of the sleeve, and also communicate with the two inlet channels 27 and 28, respectively, as shown in Fig. 1.

Fitted reciprocally and rotatably in the sleeve 30 is a tubular valve 38, and extended upwardly therefrom is a valve operating stem 40 that passes upwardly and axially through the chambers 13, 14, passage 24, and packing chamber 18, terminating above the upper end of the body 10. Suitable packing, as at 42 is applied about the stem in chamber 18 and is held by a packing nut 43 threaded into the chamber 18 and through which the stem operates. At its lower end the stem is operatively connected to the valve 38 by a pin 45 passed diametrically therethrough, and at its upper end, the stem is operatively connected to a handle 48, as presently described in detail, for its valve adjusting operation.

Formed in a sidewall of the valve sleeve 38, between its medial portion and upper end is a circumferentially directed inlet slot 50 which extends through an arc of about 180°. By an up and down adjustment of the valve, effected by the stem, the passage 50 can be moved into and from registration with one or both of the inlet passages 34 and 35, to more or less extent, thus to obtain a water mixture or to obtain all cold or all hot water. By moving the valve vertically, the passage 50 can be adjusted from and into registration with the inlet passages to regulate the volume or amount of flow, Water that enters the tubular valve through passage 50 is discharged upwardly therefrom about the stem, into the mixing chamber 13, thence into chamber 14 and out through passage 26 to which a spout or pipe, as shown at 52 in Fig. 1, may be applied.

Above the valve 38, the stem 40 is formed with an enlarged, conical and upwardly facing shoulder 55 adapted, upon closing the valve 38, to be seated against an O-ring gasket 56 that is applied against the annular shoulder 31 at the upper end of chamber 13, thus to seal the outlet from chamber 13.

Threaded onto the upper, reduced end portion 21 of body 10, is a cylindrical bonnet 60, formed coaxially with a circular, upper end opening 61 defined by an annular inwardly extending flange 62. Fitted within the bonnet 60 is a cylindrical collar 63, that rests upon the upper end of body 10. Revolvably fitted in the bonnet between the collar 63 and the flange 62 with some clearance for radial shifting is a bearing 65, as shown in Fig. 7, formed with a transversely directed slot 66 that opens through the top and to one side thereof and which slot contains therein the inner end portion of the valve adjusting handle 48. It is to be observed by reference to Figs. 1 and 2, that the handle terminates, at its inner end, in a vertically flattened and downwardly curved portion 48x that extends down into the slot 66. This downturned end portion of the handle is also formed in the longitudinal direction of the handle with a slot or channel 68 in which the upper end portion of the valve stem 40 is received and pivotally fixed by a horizontal pin 69 extended through the end of the stem, the handle. At that side of the handle head 48x that is nearest the outer end of the handle, the head is fixed, by a pivot pin 70, to the bearing 65; the pin 70 being parallel to the pin 69 and eccentric of the stem. Thus, by reason of these pivotal connections, an up and down movement of the outer end of the handle causes the valve stem to adjust the valve between open and closed positions, accordingly. Also, by a rotary movement of the handle 48 about the axial line of the valve stem, the stem and valve will be rotated accordingly. Thus through the mediacy of the handle, valve adjustments for controlling water mixture and volume may be made.

In Fig. 1, I have shown the body 10 as being equipped with hot and cold water supply pipes designated by reference numerals 73 and 74. These pipes have ends sealed in openings 75 and 76 in a disk-like coupling plate 77 that is detachably fixed to the lower end of the body 10 by a union collar 80 threaded onto the lower end of body 10. A gasket 81 is interposed between the lower end of the body, and the plate 77 to prevent any possible leakage at this point. The openings 75 and 76 register, respectively, with the inlet passages 27 and 28, thus to supply water directly thereto.

The present form of body can be made economically from bar stock, and in the form shown, it provides as a single unit what formerly comprised a valve housing and a separate plug, and which parts required considerable precision machining, grooving, and sealing gaskets in order to obtain leak tight joints and a satisfactory operation.

The faucet of Fig. 8 is substantially like that of Fig. 1 in the general arrangement of its principal parts and therefore, in the following description, parts that are like those of the faucet of Fig. 1 will be given like reference numerals. The faucet of Fig. 8, however, is equipped with a swing spout and pressure balanced valve and therefore the details of construction of parts closely related thereto will be modified accordingly.

It is shown in Fig. 8, that the lower end portion of body 10 is axially bored to provide the cylindrical chamber 12 in which a cylindrical sleeve 30 is press fitted. Also, it is shown that the body has inlet bores 27 and 28 to which pipe lines 73 and 74 are connected by the plate 77 and union 80 as previously described. The sleeve 30 is formed with inlet passages 34 and 35 communicating with the bores 27 and 28, through which water is admitted under control of the valve 38x as presently explained.

Formed coaxially of the body 10, and leading upwardly thereinto from the upper end of chamber 13 is a bore 83, which at its upper end opens centrally into a spherical socket or depression 84 formed on the upper end surface of the body 10. Directed outwardly and downwardly from bore 83 are discharge passages 85 that open into an annular channel 86 formed in and about the body and covered by the swing spout mounting sleeve 87. The sleeve 87 is formed with a port 88 opening into a spout 89. Directly above and below the annular channel 86, the body is formed with encircling channels 90 and 90' in which O-ring gaskets 91 and 92 are contained to prevent leakage.

The valve 38x as applied to this faucet is tubular and integrally formed on the lower end portion of a valve stem 40x. This valve also has an inlet 50. The stem is hollow for a distance upwardly above the level of the valve and opens into the valve and has a lateral outlet 93 into chamber 13. This stem also is formed with a conical, upwardly facing shoulder 55 adapted to close against an O-ring gasket 56 to seal against outflow into chamber 83. Above the level of the discharge passages 85, the valve stem is diametrically reduced and formed with a downwardly facing shoulder 94, facing the valve seat 55.

Threaded onto the upper end of body 10, is a hollow bonnet 95 wherein a ball 96 is retained. The ball is fitted to the spherical socket 84 for rotation, and is formed across its underside with a diametric channel 97 in which the upper end of the valve stem 40x is contained. The upper end of the stem has a laterally directed arm 98 fixed thereto with a laterally opening notch 99 at its end. A pivot pin 100 extends through the arm 98 and notch 99, thus providing an operating connection between ball 96 and stem 40x.

A handle 101 is fixed in the ball to extend upwardly and then angularly therefrom. By means of this handle the ball may be rotated toward either side by lateral swing of the arm, thus to rotate the stem and valve to regulate water mixture. Also, by an up and down movement of the handle the ball can be rotated to effect an up or down movement of the stem to open or close the valve 38x. This movement of the handle 101 is permitted by reason of a relatively large opening 102 being formed in the top of the bonnet 95 through which the handle passes. This opening is covered by a spherically curved plate 105 that is applied to the handle closely overlying the top end of the bonnet.

To prevent any possible leakage at the top of the bonnet, a sealing gasket 106 is applied in the upper end of the opening 102 of the bonnet as a bearing ring against which the ball seats.

In the faucet of Fig. 1, and also that of Fig. 8, the body 10 serves as a valve housing and valve stem mounting, thus eliminating much of the cost of manufacture, previously incurred and without any detriment to efficiency or ease of operation.

What I claim as new is:

1. A faucet comprising a unitary body formed with a bore of stepped diameters directed upwardly thereinto from its lower end, and bore providing, in succession as defined by its parts of different diameter, an inlet chamber at its lower end, a mixing chamber intermediate its ends, and a discharge chamber at its upper end, the latter chamber having an outlet leading to a side of said body, a cylindrical sleeve in said inlet chamber, said body also having hot and cold water inlets leading upwardly thereinto through its lower end surface between said sleeve and the body, said sleeve forming a valve chamber, openings through the sleeve into said valve chamber between the ends of the sleeve and connecting the valve chamber with the inlets, a movable valve element fitted in the valve chamber to control inflow through said openings to the mixing and discharge chambers, a valve stem movably mounted in the body, the outer end of said stem extending above the body and the inner end of the stem being operatively connected to said valve element.

2. The faucet of claim 1 including also a plate that is applied to the lower end surface of said unitary body and which plate is formed with ports that open therethrough in registration with the lower ends of said hot and cold water inlets of said body, and within which ports the ends of hot and cold water supply pipes are sealed; said plate being detachably secured in a water sealed joint against the end surface of said body by a union type coupling that joins said body and plate.

3. A faucet as recited in claim 1 wherein said valve element is tubular and open at its ends and has an inlet through a sidewall portion thereof that is movable by adjustment of the valve element into and from communication with said inlets as provided in said valve sleeve.

4. In a mixing faucet, a unitary body, the body having inner bores of varying diameters from the lower end toward the upper end thus forming a stepped bore, the largest bore comprising the inlet chamber having hot and cold water channels leading thereinto, a connecting member connecting the body to water inlet pipes and a sealing means between the body and connecting member, a cylindrical sleeve within the inlet chamber forming a valve chamber and coacting with the channels to form inlet passages, inlet ports in the sleeve leading to the valve chamber and connecting the valve chamber to the inlet passages, a rotary and longitudinally movable valve within the valve chamber having ports therein adapted upon movement in either direction to coincide with the inlet ports of the sleeve, the intermediate size bore comprising the mixing chamber and receiving the water from the valve chamber, said intermediate bore having a valve seat at the upper end thereof, the smallest bore comprising the outlet chamber and receiving water from the mixing chamber when the valve is longitudinally moved, and an outlet conduit connected to the outlet chamber.

References Cited in the file of this patent

UNITED STATES PATENTS

| | | |
|---|---|---|
| 491,272 | Schier | Feb. 7, 1893 |
| 1,945,645 | Kumpman | Feb. 6, 1934 |
| 2,017,317 | Magney | Oct. 15, 1935 |
| 2,087,223 | Thompson | July 13, 1937 |
| 2,471,725 | Clifford | May 31, 1949 |
| 2,609,206 | Moen | Sept. 2, 1952 |
| 2,757,687 | Moen | Aug. 7, 1956 |
| 2,766,774 | Mornard | Oct. 16, 1956 |
| 2,818,878 | Russell | Jan. 7, 1958 |
| 2,857,930 | Dombre | Oct. 28, 1958 |